United States Patent [19]

Snelling et al.

[11] 4,099,140
[45] Jul. 4, 1978

[54] CHEMICAL LASER PROCESS AND APPARATUS

[75] Inventors: David R. Snelling, Ste-Foy; Robert D. Suart; Kenneth D. Foster, both of Lac Beauport, all of Canada

[73] Assignee: Minister of National Defence, Ottawa, Canada

[21] Appl. No.: 667,260

[22] Filed: Mar. 15, 1976

[30] Foreign Application Priority Data

Mar. 14, 1975 [CA] Canada ............................. 222092
Jan. 13, 1976 [CA] Canada ............................. 243453

[51] Int. Cl.$^2$ ........................................... H01S 3/095
[52] U.S. Cl. ............................................. 331/94.5 G
[58] Field of Search ............... 331/94.5 G; 330/4.3; 423/481, 477, 500; 204/DIG. 11

[56] References Cited

U.S. PATENT DOCUMENTS

| 2,309,457 | 1/1943 | Hutchinson | 423/477 |
| 3,706,050 | 12/1972 | Cason | 331/94.5 G |
| 3,876,959 | 4/1975 | Biancardi et al. | 331/94.5 G |

OTHER PUBLICATIONS

Cool et al., "HCl, F, and DF Partially Inverted CW Chemical Lasers," vol. 41, No. 10, Sept. 1970, Journal of Applied Physics, pp. 4038–4050.
Bemand et al., "Reactions of Chlorine Oxide Radicals," Journal of The Chemical Society, Faraday Transactions, No. 1, vol. 69, 1973, pp. 1356–1374.
Rosen et al., "WB4-A Spectroscopic Study of CW Chemical Lasers," IEEE Journal of Quantum Electronics, vol. QE-9, No. 1, Jan. 1973, pp. 163–172.

*Primary Examiner*—William L. Sikes
*Assistant Examiner*—Marcus S. Rasco
*Attorney, Agent, or Firm*—Murray and Whisenhunt

[57] ABSTRACT

A continuous flow chemical laser is described in which chlorine dioxide and nitric oxide are reacted to produce atomic chlorine and hydrogen iodide is then introduced into the flow stream to form hydrogen chloride in an excited state. The hydrogen chloride may itself be lased in a transverse flow laser or carbon dioxide may be introduced which may be lased in a longitudinal or transverse flow laser. The required chlorine dioxide may be generated by passing chlorine and helium or another inert gas through loosely packed sodium chlorite. The nitric oxide may be introduced in two successive steps first to yield chlorine monoxide and in the second stage to yield atomic chlorine. The latter reaction facilitates operation in the supersonic transverse flow mode in which the hydrogen iodide and second injection of nitric oxide are made just as the flow stream is being transformed from a subsonic flow rate to supersonic flow rate.

5 Claims, 6 Drawing Figures

CHEMICAL LASER PROCESS AND APPARATUS

This invention relates to a chemical laser wherein chlorine dioxide is reacted with nitric oxide to produce atomic chlorine, which in turn is reacted with hydrogen iodide to form hydrogen chloride at excited energy levels. The hydrogen chloride may itself be lased, preferably in a transverse flow laser, or its vibrational energy may be transferred to another molecule such as carbon dioxide to produce hybrid chemical laser action. Longitudinal flow and transverse flow laser apparatus adapted to implement the foregoing reactions constitute additional aspects of the present invention. Furthermore, proposals are made for extending the transverse flow laser operation to supersonic flow rates.

SUMMARY OF THE PRIOR ART

For the purposes of this discussion, a chemical laser is defined as a laser in which the lasing constituent or constituents are directly derived from exothermic chemical reactions, requiring no energy input for production of any of the reagents. (Energy will normally be required to exhaust spent reagents from the laser.)

The reactions required in continuous wave (CW) chemical lasers are ordinarily arranged to occur in flowing gases. Accordingly, CW chemical lasers are made in two general configurations with respect to the direction of gas flow. In the first, the gas flow is parallel to the optical axis, i.e. the line connecting the laser mirrors. Such lasers are referred to as longitudinal flow lasers, wherein the excited gases enter the optical cavity near one end and flow parallel to the optical axis to be exhausted near the other end. Since the gases have an appreciable dwell time in the optical cavity, the properties of the mixture will change as the gases flow from one end to the other. It is not possible to specify the conditions of the laser medium without taking account of the evolution of the gases with time as they make their passage through the optical cavity.

Transverse flow lasers are those in which the gases flow through the optical cavity at right angles to the line connecting the mirrors. In this flow configuration, all the molecules along the optical axis are at generally the same stage of time development. The dwell time of the gases in the cavity can be made relatively much shorter than in the case of the longitudinal flow lasers. Since the excited molecules reach a maximum concentration at a definite time, the transverse flow geometry allows the optical axis to be coincident with this region of maximum concentration.

The general problem in the development of chemical lasers is to discover chemical reactions that generate products in an excited state. This excitation must be such as to exhibit a "population inversion" between the excited states(s) and a stage lying lower in energy; an optical transition (laser transition) must be possible between the two states. Many such reactions are currently known, for example:

where the superscript † indicates a vibrationally excited molecule. These reactions are now substantially exploited in the present state of the art (see example Cool et al., Journal of Applied Physics, Vol, 41, No. 10, Sept. 1970, p. 4038).

The population inversion required may be produced in a multi-step process, where excitation is generated in one step, and, by subsequent energy transfer, the population inversion is produced in another molecule. This is also currently exploited in the art in so-called "hybrid chemical lasers." For example, the following sequence of processes provide inversion in $CO_2$ according to a well-known $CO_2$ laser transition populated by vibrationally excited HF.

Many chemical lasers require a gaseous atomic species (as distinguished from the usual molecular state) as one of the reagents. For example, molecular chlorine ($Cl_2$) is not known to be directly useful, but must first be dissociated into Cl atoms. Much chemical laser research has been directed to finding efficient atom production methods. Atomic species such as those mentioned above are conventionally produced by using external sources of energy to dissociate molecules (e.g. by using electrical energy or ultra-violet or other electromagnetic radiation.)

In a few cases it has proven possible to produce the atomic species by a chemical reaction. The reaction of nitric oxide with fluorine ($NO + F_2 \rightarrow NOF + F$), and combustion of fluorine-rich, hydrogen-fluorine mixtures are examples of known chemical reactions for production of fluorine atoms.

In this way purely chemical laser operation has been demonstrated for hydrogen fluoride and deuterium fluoride lasers operating simultaneously on several transitions near 2.8 microns and 3.9 microns respectively. The vibrationally excited hydrogen fluoride and deuterium fluoride have also been used to excite hybrid carbon dioxide lasers at 10.6 microns.

Continuous wave chemical lasers are known (see for example, U.S. Pat. No. 3,668,215 of Aug. 29th, 1972 assigned to the United States of America as represented by the Secretary of the Air Force and naming Donald J. Spencer, Harold Mirels, Theodore A. Jacobs and Rolf W. F. Gross as inventors). In this patent the inventors teach the operation of a continuous wave chemically pumped laser in which the pumping action is achieved by a chemical reaction and in which a supersonic jet containing fluorine atoms, produced in an arc, and an inert gas is reacted with hydrogen or deuterium and hydrogen fluoride is obtained in a vibrationally excited state which can then lase in a suitable optical laser cavity. As taught in this patent, the laser action is of the continuous-wave type and is capable of providing sustained laser power for long time durations. Such lasers are referred to as "chemically pumped" because the vibrational population inversion and radiation energy are obtained directly by a chemical reaction.

U.S. Pat. No. 3,560,876, granted the 2nd of Feb., 1971, discloses a supersonic flow chemically pumped gas laser in which hydrogen chloride, hydrogen bromide, or hydrogen fluoride are used as a lasing medium which is formed in a supersonic mixing chamber. Once again the halogen component is dissociated by means of an electrical discharge as is the case in U.S. Pat. No. 3,688,215 previously referred to.

Although atomic chlorine is known to be a useful reagent for generating excited molecules, as in the reaction $$Cl + HI \rightarrow HCl^\dagger + I$$

the prior art does not disclose chemical production of chlorine atoms for use in chemical lasers. However, various lasers based on the electrical production of chlorine atoms have been reported. A chemical laser using chlorine rather than fluorine would be desirable because of the lower cost of chlorine and the lower corrosive activity of chlorine as compared with fluorine.

A hybrid continuous-wave (CW) chemical laser based on the reaction of chlorine atoms with hydrogen iodide and the subsequent energy transfer to carbon dioxide has been previously disclosed. See for example, T. A. Cool and R. R. Stephens, International Journal of Chemical Kinetics, 1, 495 (1969). This hydrogen chloride/carbon dioxide hybrid laser operates on the following chemical processes:

$$Cl + HI \rightarrow HCl^\dagger + I$$

$$HCl^\dagger + CO_2 \rightarrow HCl + CO_2^\dagger$$

where the $CO_2^\dagger$ thus formed supports laser action near 10.6 microns.

Lasing of the excited $HCl^\dagger$ intermediate at 3.8 microns has also been effected both in longitudinal flow lasers: see for example, T. A. Cool et al, as aforesaid, and in transverse flow lasers: see for example, J. A. Glaze, J. Finzi, and W. F. Krupke, Applied Physics Letters, 6, 121 (1970).

The chlorine atoms required for these devices were generated by the electrodeless discharge (via applied microwave or radio-frequency electromagnetic radiation) of $Cl_2$ diluted in a suitable inert gas such as helium.

An early transverse flow CW HCl flow laser was developed by D. W. Naegeli and C. J. Ultee, as described in Chem. Phys. Letters 6, p. 121 (1970). In their device, $Cl_2$, mixed with He, was dissociated in a two-stage electrical discharge and then allowed to flow through a duct and mixed with HI. This reacting mixture then flowed across the optical cavity in the transverse sense. The flow was subsonic (about 165 m/s). Total power consumption in the discharges and total output power were not reported.

The most recent work on transverse flow HCl CW lasers known to the inventors is that of M. J. Linevsky and R. A. Carbetta, described in "Chemical Laser Systems", General Electric Space Sciences Laboratory Semi-Annual Technical report, March-Sept. 1973, 73SD4278, and in Paper MB-7 of the Fourth Conference on Chemical and Molecular Lasers, St. Louis, MO., October 1974. These authors worked with an apparatus similiar to that to be described in the present specification, with the exception that the flow of chlorine atoms was generated by means of a 200W electrical discharge in He-$Cl_2$ mixtures. The Cl atoms thus formed were reacted with HI immediately before the flow passed through the optical cavity, in common with the other transverse flow devices described above. When the flow was 0.5 mmol s$^{-1}$ Cl atoms, a power of about 5 Watts could be extracted. The pressure in the cavity was near 4 torr.

A chemical method of producing atomic chlorine is known as follows:

| | | |
|---|---|---|
| $ClO_2 + NO \xrightarrow{1} ClO + NO_2$ | | $K_1 = 3.4 \times 10^{-13} cm^3 s^{-1}$ |
| $ClO + NO \xrightarrow{2} Cl + NO_2$ | | $K_2 = 1.7 \times 10^{-11} cm^3 s^{-1}$ |
| $Cl + ClO_2 \xrightarrow{3} 2ClO$ | | $K_3 = 5.9 \times 10^{-11} cm^3 s^{-1}$ |

From these reactions and rate constants, it is seen that, when two volumes of NO are mixed with one of $ClO_2$, the overall reaction produced Cl and 2NO, as:

$$ClO_2 + 2NO \rightarrow Cl + 2NO_2$$

See. P. P. Bemand, M. A. A. Clyne and R. T. Watson, Journal of the Chemical Society, Faraday Transactions 1, 69, 1356 (1973): J. A. Coxon, Transactions of the Faraday Society, 64, 2118 (1968).

Chemical methods of deriving chlorine dioxide ($ClO_2$) are also known, although never previously used in a laser context. According to one such method, loosely packed sodium chlorite ($NaClO_2$) is flushed with molecular chlorine and helium. The following reaction occurs between the gaseous $Cl_2$ and the solid $NaClO_2$ packing material:

$$Cl_2 + 2NaClO_2 \rightarrow 2 NaCl + 2ClO_2$$

See Woodward et al, Trans. Am. Inst. Chem. Engrs. 40, p. 27, (1945).

Chlorine dioxide is also available as a commercial product stored in an aqueous solution. The required $ClO_2$ may be liberated from the solution by bubbling a counter current of an appropriate inert gas such as helium therethrough. Since this activity would liberate not only the $ClO_2$ but also a certain amount of water vapour, it would be necessary to pass the effluent through a drying stage to eliminate most of the water vapour, since the water vapour would tend to quench the laser activity.

The helium is useful for two reasons: (a) Firstly, since it is convenient to operate the $ClO_2$ generator at atmospheric pressure and since, to avoid risks of explosion, the $ClO_2$ pressure should be less than 60 torr, then it is desirable to include a flow of inert gas through the $ClO_2$ generator. Furthermore, for a fixed pressure of $ClO_2$, the presence of inert diluent gas reduces the risk of explosions. (b) Secondly, in any case, efficient lasing action requires that the potential temperature rise due to the heat liberated from the various reactions be reduced by the presence of inert gas.

SUMMARY OF THE INVENTION

In accordance with the present invention, the lasing of excited hydrogen chloride is accomplished by purely chemical means. To this end, either of two processes is employed.

In the first process, chloride dioxide is generated and reacted with nitric oxide to yield the required chlorine atoms. This may be accomplished either by mixing two volumes of nitric oxide with one of chlorine dioxide in a single stage, or by "splitting" the reaction by first reacting one volume of nitric oxide with one volume of chlorine dioxide to form chlorine monoxide and then reacting a second volume of nitric oxide with the chlorine monoxide thus formed to generate chlorine atoms. The split reaction is likely to be found suitable for use in supersonic transverse flow laser apparatus.

The atomic chlorine thus liberated may be reacted with hydrogen iodide to form hydrogen chloride at elevated energy levels for use in direct lasing activity of the hydrogen chloride, or the vibrational energy of the hydrogen chloride may be transferred to another substance such as carbon dioxide for lasing of the latter material in a hybrid laser. In longitudinal flow lasers, the hybrid mode is more suitable, because of the longer lifetime of excited $CO_2$ molecules, whereas lasing of the hydrogen chloride is to be preferred in transverse flow lasers because of the superior efficiency obtained by lasing the hydrogen chloride itself.

In the second process, chlorine dioxide is generated and mixed with hydrogen iodide. Into this mixture nitric oxide is injected. The result is the production of excited hydrogen chloride.

The second process might at first sight appear to be impracticable because since atomic chlorine is liberated by the reactions $$ClO_2 + NO \rightarrow ClO + NO_2$$

$$ClO + NO \rightarrow Cl + NO_2,$$

it might be expected that the atomic chlorine would react preferentially with the hydrogen iodide, thus preventing the third reaction in the chain, viz.

$$Cl + ClO_2 \rightarrow 2ClO$$

from generating the additional amounts of ClO required to sustain the chain reactions. However, it has been found that the reactions will proceed at an acceptable rate if the $ClO_2$ and NO concentrations are sufficiently high relative to the HI concentration. The second process affords the advantage that a single injection of nitric oxide into the HI-$ClO_2$ mixture is sufficient to initiate the reaction.

For either the first or second process above, the required chlorine dioxide is suitably supplied in admixture with an appropriate inert gas, such as helium.

The chlorine dioxide may be obtained utilizing known techniques, such as flushing sodium chloride with chlorine and such suitable inert gas, or by flowing such suitable inert gas through chlorine dioxide dissolved in water.

It is important to recognize, at least in a qualitative sense, the inter-relationship between the significant parameters which govern the construction of chemical lasers making use of the aforementioned reactions. Pressures, flow rates, concentrations, and physical dimensions must be correlated so that the required chemical reactions occur in the right place at the right time. Because of loss reactions of reactive species and so-called "relaxation" phenomena associated with excited vibrational states of molecules, it is necessary in the interests of relatively efficient laser operation to utilize the available reactive species before they are depleted. Furthermore, it must be recognized that certain chemical reactions occur at certain definite rates, and therefore in a flowing gas system require a certain minimum path length for a reasonable level of completion of the reaction (for a given flow rate concentration, etc). Accordingly the governing parameters must be adjusted to permit the necessary reactions to be completed, but once they have been completed, use must be made of the reaction products before their useful energy becomes dissipated by relaxation phenomona.

The chlorine dioxide required in the chemical laser according to the invention is an unstable and explosive material and therefore should be used as quickly as possible after it is generated. However, given that direction, it is not necessary to specify precisely the concentration level, pressure, or average linear flow velocity associated with the supply of chlorine dioxide, nor to specify the dimensions of its passageway, provided that it is understood that is should be consumed expeditiously and that its concentration, pressure and average linear flow velocity should be chosen to accommodate the governing parameters for the later reactions occurring in the apparatus.

In the first process, the supplied chlorine dioxide is reacted with nitric oxide to produce atomic chlorine. First assuming that the nitric oxide is supplied in a single stage and that no split reaction (to be described further below) is arranged, calculations based upon the above reactions 1, 2 and 3 indicate that the time required for 90 percent completion of the NO-$ClO_2$ reaction is given by the following equation:

$$T_r = \frac{D}{V} = \frac{5 \times 10^{11}}{[ClO_2]} \qquad (6)$$

where
$T_r$ is the reaction time in seconds for 90 percent completion of the reaction;
D is the distance along the flow line following the introduction of the nitric oxide into the chlorine dioxide flow, required for 90 percent completion of the reaction;
V is the linear velocity of flow of the reagents; and
[$ClO_2$] is the initial concentration of chlorine dioxide in molecules per cubic centimeter.

Once the chlorine atoms are obtained, it is necessary to react them with the hydrogen iodide before the free chlorine atoms recombine into chlorine molecules. A useful working time period may be taken as one in which the required reaction time is appreciably less than the time required for 63 percent loss of chlorine atoms (a 63 percent loss corresponds to a remaining concentration which is (1/e) times the initial concentration, where e is the base of natural logarithms). The time for 63 percent loss of chlorine atoms has been calculated from the rate constants for the loss processes to be given by the following relationship:

$$T_{Cl} = \frac{2.2 \times 10^{13}}{[ClO_2] \cdot P} \qquad (7)$$

where
$T_{Cl}$ is the time for 63 percent loss of chlorine atoms;
[$ClO_2$] is the initial concentration of chlorine dioxide in molecules per cubic centimeter; and
P is the total pressure prevailing in the reaction chamber, in torr.

Optimally, the following relationship should prevail:

$$T_r < T_f < T_{Cl} \qquad (8)$$

where
$T_r$ is the time for 90 percent completion of the reaction of nitric oxide with chlorine dioxide;

$T_f$ is the actual flow time of NO with $ClO_2$ permitted in the apparatus before the Cl atoms are utilized; and $T_{Cl}$ is the time for 63 percent loss of chlorine atoms. (In practice, a flow time $T_f$ about equal to or just greater than $T_r$ and less than one-fifth of the time for 63 percent loss has been considered to be reasonably satisfactory).

While the foregoing relationships have been determined on theoretical grounds, such empirical investigations as have been made to date to indicate that they are reasonably accurate. However, it is possible that further empirical studies will reveal that the above equations and relationships have to be adjusted to a limited extent for optimum laser performance.

The next significant reaction in the first process is that of the chlorine atoms with the hydrogen iodide. The hydrogen iodide should, according to the above governing considerations, be introduced at the end of the indicated flow time before any appreciable loss of chlorine atoms has occured. In practice, it has been found that the optical cavity should follow the point of introduction of the hydrogen iodide as immediately adjacent as dimensional and structural limitations permit. The reaction of the hydrogen iodide with the atomic chlorine is very fast, and therefore the governing consideration is not the reaction speed but the mixing time, and the relaxation time of the HCl . In other words, it is necessary to make use of the excited hydrogen chloride produce before its vibrational energy is dissipated.

From the limited available data on the relaxation of HCl , it has been estimated that self relaxation of excited hydrogen chloride can be considered to be substantially complete (i.e. at least about ⅔ complete) within a time $T_{HCl+}$ given, approximately, by the following relationship:

$$T_{HCl+} = \frac{1}{6 \times 10^{-12} [HCl^+]} \quad (9)$$

where [HCl⁺] is the concentration of excited hydrogen chloride, and $6 \times 10^{-12} cm^3 s^{-1}$ is the estimated relaxation rate constant.

Since we require the actual flow time between the introduction of hydrogen iodide and the arrival of the gas at the optical centre of the laser cavity to be substantially less (say 1/5 or less) than the above-identified relaxation time $T_{HCl}$, we can derive an upper limit to the actual flow time between the source of the hydrogen iodide and the optical axis. This flow time of course is equal to the distance between the hydrogen iodide injector and the optical axis of the cavity, divided by the average linear flow velocity. Since this flow velocity however has been previously established in relation to the distance between the nitric oxide injector and the hydrogen iodide injector, it is possible to derive, for a given concentration of reagents, the relationship between the distance of the nitric oxide injector from the hydrogen iodide injector on the one hand and the distance of the hydrogen iodide injector from the laser optical axis on the other hand. The actual relationship will depend upon the relationship chosen between the actual flow times and the times required for 63 percent loss of relevant constituents.

In a longitudinal flow laser utilizing subsonic linear velocities, the above relationships indicate that the dwell time required in a practical longitudinal flow laser construction is too long in relation to the available useful life-time of excited hydrogen chloride molecules to permit a practical lasing of the hydrogen chloride. Accordingly, in such longitudinal flow lasers the vibrational energy of the hydrogen chloride is transferred to some other suitable molecule, such as carbon dioxide, having a longer life-time at excited levels.

In order to utilize the more efficient hydrogen chloride lasing operation, a transverse flow laser may be constructed in which the governing parameters are given according to the above relationships. At subsonic flow rates, no additional parameters require special consideration. However, in order to maximize the available power output for a given size of apparatus, it would be desirable to increase both $HCl^+$ concentration and velocity. It will be appreciated that higher power can be derived from higher concentrations, but since higher concentrations give rise to more rapid relaxation, it is necessary to increase the linear flow velocity substantially in order to reduce or accommodate such higher concentrations. This can be done by increasing the linear flow velocities into the supersonic range. However, such supersonic operation requires equipment modification in order to accommodate the supersonic phenomena. According to a further proposal to be described, such supersonic phenomena are accommodated both chemically and structurally.

First, from a chemical point of view, a "split nitric oxide" reaction may be employed so that one volume of nitric oxide is first of all reacted with the chlorine dioxide to form chlorine monoxide, and then the chlorine monoxide is subsequently reacted with a second volume of nitric oxide to liberate chlorine atoms. In principle the hydrogen iodide can be injected into the reaction chamber along with the second volume of nitric oxide, since the reactions associated with the two reagents are non-chain reactions which occur very rapidly.

In practice, a slow reaction between HI and NO necessitates a careful design of the NO/HI injection.

Structurally, the proposed apparatus is designed so that the first chlorine dioxide - nitric reaction occurs at high pressure at subsonic flow rates. A nozzle immediately follows this reaction chamber to cause the high pressure gases to acquire supersonic velocity. While the gases are flowing at supersonic velocity, the remaining nitric oxide and the hydrogen iodide are injected together, and the laser cavity immediately follows. The reacted gases continue to flow at supersonic veocity through the laser cavity. It may be possible to provide a diffuser beyond the laser cavity to permit the gases to reacquire a somewhat higher pressure, which would facilitate the exhaustion of the gases by pumping.

The use of the second process described above avoids the need for analysis of some of the operating conditions applicable to the reactions in question, because the reactions in accordance with the second process are initiated by a single injection (of nitric oxide), whereas in the first process, a first set of reactions initiated by the nitric oxide injection is followed by a second set of reactions initiated by a subsequent hydrogen iodide injection. On the other hand, it is necessary when practising the second process to recognize the desirability of maintaining a slight excess of chlorine dioxide and a considerable excess of nitric oxide, for a given hydrogen iodide concentration, over that which would have been required by the first process to produce sufficient chlorine atoms to react with the hydrogen iodide. A NO concentration at least of the order of four times the $ClO_2$ concentration (and hence resulting in a volumetric ratio of NO to $ClO_2$ in the order of 4:1) is preferred.

The second process may also prove to be useful in supersonic operation, in which case the split NO reaction would be unnecessary.

Hydrogen bromide may be substituted for hydrogen iodide in the split NO reaction or using the second process described above, with appropriate changes in system parameters.

Figure 1:
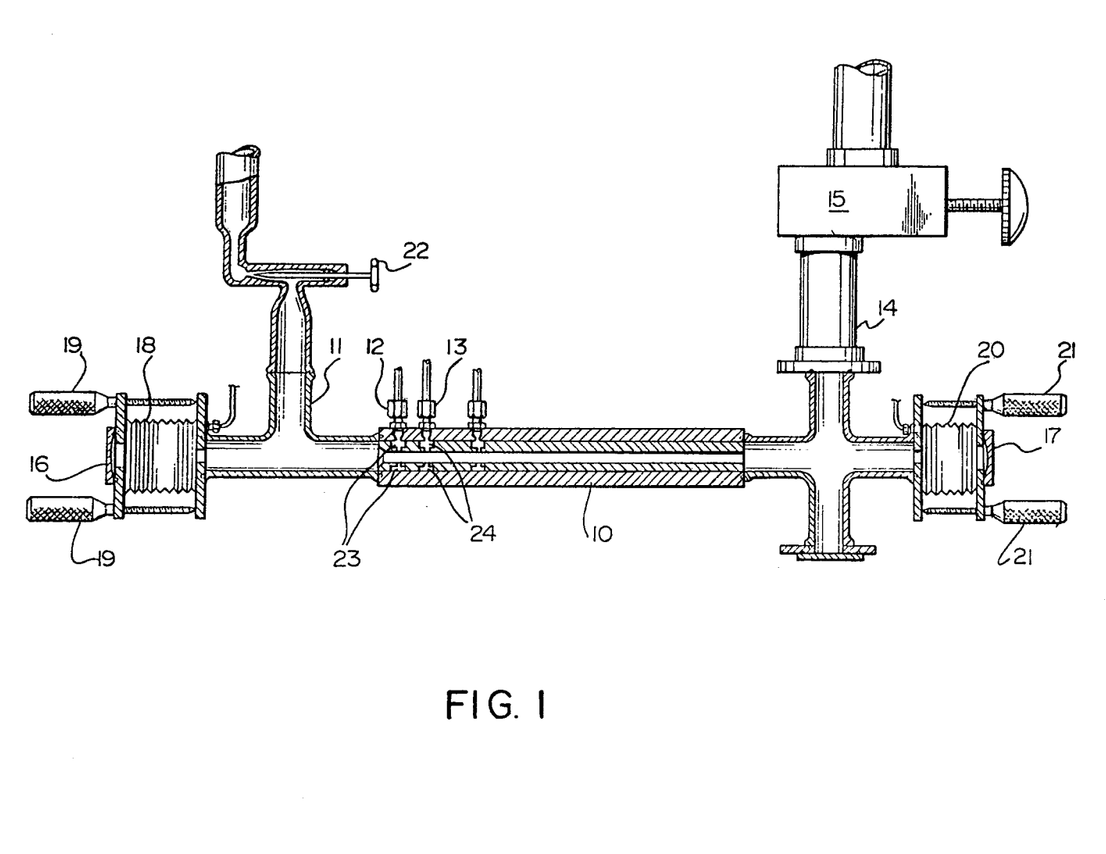
FIG. 1 is a transverse section of an embodiment of longitudinal flow laser apparatus constructed in accordance with the present invention.

Referring to FIG. 1, an embodiment of a continuous-wave (CW) $HCl/CO_2$ hybrid longitudinal-flow laser pursuant to the present invention includes a laser tube 10 having a first inlet 11, a second inlet 12, and a third inlet 13. An exhaust tube 14 is connected to the laser tube 10 and communicates with appropriate cooling traps and pumping apparatus (known per se in the art) via valve 15 capable of achieving near-sonic flow at the end of laser tube 10. The laser tube 10 is provided at opposite ends with a pair of laser mirrors 16 and 17, known per se in the art. Mirror 16, which may be, for example, a spherical frontsurface totally reflecting laser mirror of the type known as a protected metal germanium mirror (i.e., the germanium is impervious to chemical contamination by the atmosphere), is mounted in a vacuum tight bellows 18 provided with conventional alignment screws 19 as is known in the laser art. Similarly, mirror 17 which may be, for example, a spherical front-surface or planar front-surface partially transmitting laser mirror of, for example, 2% transmission, and may be a dielectric-coated germanium mirror, is mounted in a bellows 20 provided with adjusting screws 21 for adjusting the alignment of the mirror.

Inlet 11 is connected to a suitable chlorine dioxide generator, for example that described in relation to FIG. 2 below, through a needle valve 22 to control the chlorine dioxide/helium flow from the chlorine dioxide generator. Since $ClO_2$ is unstable, the $ClO_2$ generator should be connected as closely as possible to the laser apparatus, and the $ClO_2$ consumed as expeditiously as possible. Inlet 12 is connected to a source of nitric oxide and connects to an injector 23 which for example may consist of twelve holes 0.75 millimeters diameter equally spaced around the circumference of laser tube 10. Laser tube 10 may typically consist of a Teflon tube 1 centimeter inside diameter by 30 centimeters in length. Inlet 13 is connected to a similar injector 24 which is spaced far enough for a given rate of flow, from the injector 23 to allow substantial completion of the chemical reaction $$ClO_2 + 2NO \to Cl + 2NO_2$$

(It will be recalled from the preceding discussion that 90% completion occurs in about $(8 \times 10^{11}/[ClO_2])$ seconds, where $[ClO_2]$ is the concentration of chlorine dioxide in molecules/cm3).

Inlet 13 may be connected to a source of hydrogen iodide (HI) and carbon dioxide ($CO_2$) so that hybrid lasing action may be obtained. A mixture of $ClO_2$ and He is admitted through the inlet 11 and reacts with NO admitted through the injector 23 to provide atomic chlorine in the laser tube. The chlorine then reacts with HI in the reaction $$Cl + HI \to HCl^\dagger$$

which results in the production of the HCl molecule in an upper excited state. The HCl vibrational energy is then transferred to the $CO_2$ molecules, which emit light in dropping to a lower energy level. The result is that hybrid chemical laser action occurs, with lasing of the $CO_2$ molecule at 10.6 microns.

A prototype of the structure illustrated in FIG. 1 has been successfully operated with a power of 7 mW using the following flows expressed in standard cubic centimeters per minute of gases:

| | |
|---|---|
| chlorine dioxide | 100 |
| helium (mixed with the chlorine dioxide) | 3500 |
| carbon dioxide | 1540 |
| hydrogen iodide | 100 |
| nitric oxide | 200 |

The total pressure in the laser was 7.5 torr.

Figure 2:
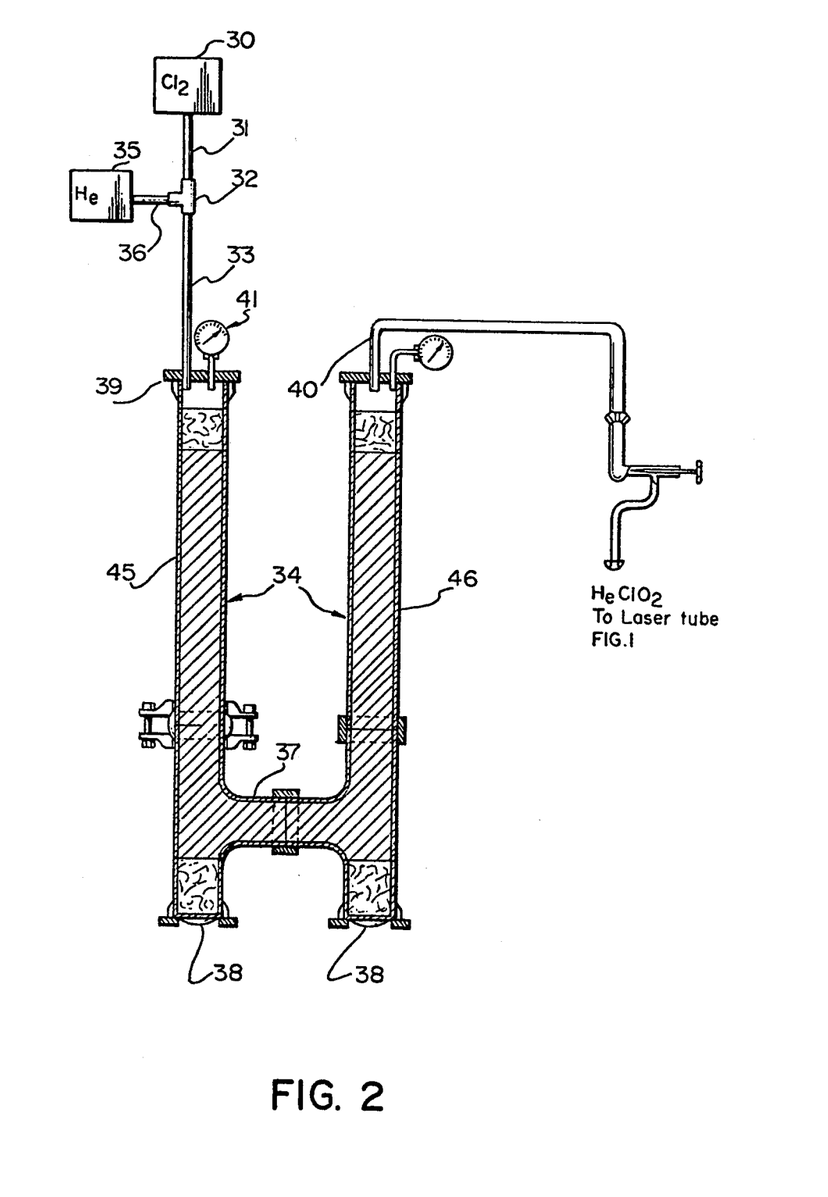
FIG. 2 is a transverse section of an embodiment of a chlorine dioxide generator for use with laser apparatus constructed in accordance with the present invention.

FIG. 2 illustrates a chlorine-dioxide generator suitable for use in supplying chlorine-dioxide and helium to the laser apparatus of FIG. 1. Molecular chlorine from a source 30 is fed via tubing 31, T-connection 32, and tubing 33 to a reactor column 34. Similarly, helium from a source 35 is fed via tubing 36 to the T-connection 32 and into the reactor 34. The reactor 34 as illustrated in FIG. 2 consists of two columns 45 and 46 connected by a cross-connection 37 at the bottom and provided with lead rupture discs 38, Teflon closures 39, and an outlet 40. The two columns 45 and 46 are packed with sodium chlorite ($NaClO_2$) flake packing. Glass wool packing is provided in a Section 37 and at the top and bottom of each of the columns 45 and 46.

The $ClO_2$ generator tube 34 may be constructed of Corning "Double Tough" Pyrex* glass plumbing with a 4 in. inside diameter. The entry and exit to the columns may be sealed by means of ⅜ in. thick Teflon* plates 39 sealed to the glass surface by means of a perfluorocarbon putty. This putty may be made by heating fine Teflon* powder and fluorocarbon wax together in methylene chloride to form a heavy, malleable paste. This paste has been found to be generally useful for sealing joints of relatively smooth mating surfaces that are to be exposed to highly reactive halogen compounds.
*Trade mark All the glass sections are held together with the standard bolts and collars, the seals preferably being made with Teflon* gaskets. The bottoms of the vertical columns 45 and 46 on each side may be closed with sheets of 1/16 in. thick lead 38 which can be sealed with the putty. These lead sheets serve as rupture discs in the case of explosion or overpressure in the column.
*Trade mark The feed of gas to the column may consist of a stainless steel gas handling system, employing ¼ in. OD stainless steel tubing and stainless steel ¼ in. "Swagelok"* fittings. Bottled He and $Cl_2$ may be employed. The He can be handled in the usual way with standard regulators and pressure gauges. The flow can be measured with a flowmeter at a pressure of 1200 torr absolute. The $Cl_2$ can be measured at 1200 torr absolute pressure using a flowmeter made of Monel. The two flows are combined and fed directly into the column which is controlled at the desired operating pressure shown on gauge 41 by means of a glass and Teflon* needle valve (22, FIG. 1) at the effluent end. The flowmeters may be calibrated from measured filling times of a known volume.
*Trade mark The reactor 34 is filled with (say) about 20 lbs. reagent grade "flaked" sodium chlorite ($NaClO_2$). With this packing no measurable pressure drop within ± 5 torr has been detected in prototype apparatus when a helium flow rate of 7000 standard $cm^3$ per minute (SCCM) was passed through the column.

In the prototype apparatus, the $ClO_2$ column supplied a flow of $ClO_2$, highly diluted in He gas ($\simeq$4%) at a flow rate of about 100 SCCM of $ClO_2$. The column itself was always run at a pressure of 970 torr and the flow was regulated by the needle valve at the effluent end of the column. By means of this needle valve, the gas pressure was reduced to that required in the laser; about 10 torr.

To establish the flow, the desired feeds of He and $Cl_2$ were set up in the gas feed system to the column, and the operating pressure was maintained at 970 torr with the needle valve. In this way, a steady feed of $ClO_2$/He to the laser could easily be maintained.

Typical flow rates of He plus $Cl_2$ were on the order of 3500 SCCM; the total volume of the empty column was 27 liters. If the free volume of the column packed with $NaClO_2$ is 3 liters, then the residence time of the gas in the column is on the order of 50 s. The free volume was not measured.

With a fresh charge of $NaClO_2$ in the column, a flow of 121 SCCM of $Cl_2$ and 5000 SCCM He was admitted continuously to the column. The column was found to yield approximately 240 SCCM $ClO_2$.

There is generally insufficient $Cl_2$ evolved from the column to permit reliable measurement with the $Cl_2$ optical absorption tube described above. With an extinction coefficient of 25 $M^{-1}cm^{-1}$, the minimum reliably detectable pressure of $Cl_2$ is about 0.4 torr in the total effluent gas pressure of 970 torr. After verifying the low $Cl_2$ pressure in the effluent gas, use of the optical absorption tube was abandoned in order to eliminate the possibility of loss of $ClO_2$ by photolysis with the probe beam.

Figure 3:
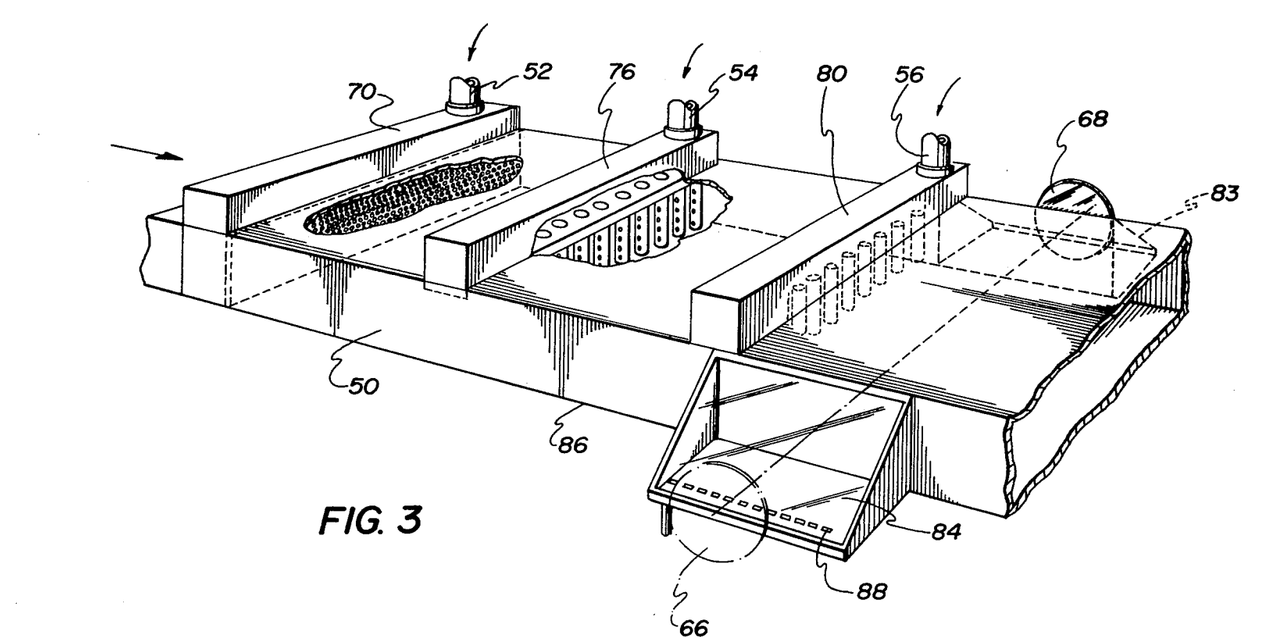
FIG. 3 is a perspective view of an embodiment of a transverse flow laser apparatus constructed in accordance with the present invention.
Figures 4, 5, 6:
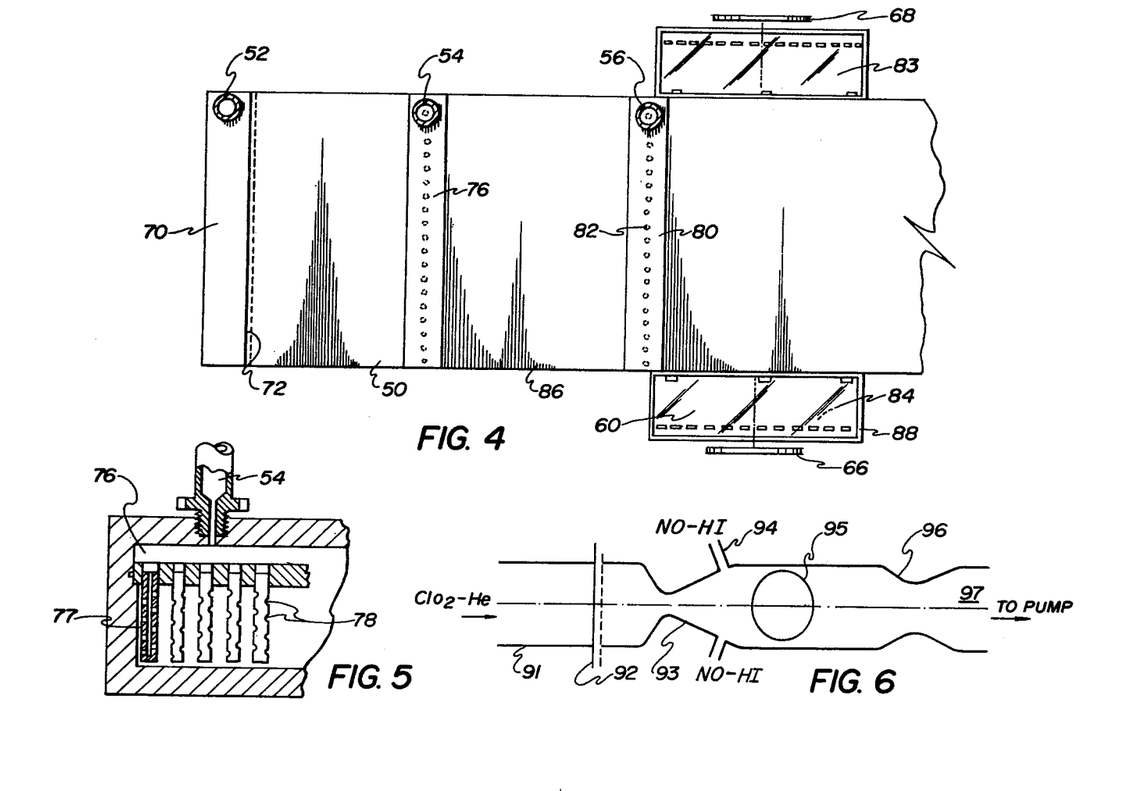
FIG. 4 is a plan view of the laser apparatus of FIG. 3.
FIG. 5 is a detail fragment view in section of a gas injector array for use in the apparatus of FIG. 3.
FIG. 6 is a schematic longitudinal elevation section view of a supersonic transverse flow laser apparatus constructed in accordance with an extrapolation of the teachings of the present invention.

An embodiment of a transverse flow laser constructed according to the invention is depicted in FIGS. 3 to 5 inclusive. The laser generally comprises a rectangular housing 50 provided with spaced input conduits 52, 54, 56 for the introduction of the required gaseous reagents. The laser cavity section of the apparatus, generally indicated by reference numeral 58, is provided between two mutually opposed inclined windows 83, 84. These windows are inclined at the Brewster angle with respect to the parallel top and bottom surfaces of the housing 50 in order to minimize the reflection of light by the windows 83 and 84. The windows 83 and 84 are sealed to the housing by conventional O-ring type seals, as is known per se in the art. The housing 50 continues beyond the downstream end 54 of the laser cavity section of the apparatus into a conventional cold trap and a suitable pumping facility, neither of which is illustrated. Opposed laser mirrors 66, 68 are coaxially mounted on either side of the opposed windows 60, 62. The conventional mounting and adjustment structures for the mirrors 66, 68 are not illustrated.

The operation of the apparatus in accordance with the first process will now be described. A flow of $ClO_2$ mixed with He enters the laser housing 50 from a suitable $ClO_2$ generator through the supply tube 52. The mixture enters a plenum 70 at a suitable pressure (say about 50 torr), then escapes through a perforated baffle plate 72 into flow channel 74 in which the pressure is much lower, say 2 torr. The baffle plate may be made of Teflon* drilled with an array of small holes of, say, 1 mm diameter. This serves to constrict the flow prior to entry into the flow channel 74 in order to produce an even flow pattern in the channel.
*Trade mark Nitric oxide gas is then metered into the flow channel through feed-tube 54, plenum 76 and series of Teflon* gas injection needles 77. Each of these needles 77 is drilled with small holes 78 (e.g. 0.3 mm diameter) disposed such that the injected gas is directed across the flow substantially at right angles to the main gas stream in the flow channel 74. The scale of the needles 77 and holes 78 is exaggerated in the drawings for ease of illustration. The NO pressure in the plenum 76 is preferably maintained sufficiently high that the gas flows through the holes in the injector needles at near sonic velocity to promote efficient gas penetration and mixing in the flow channel.
*Trade mark After passing the location of the NO injector needles, the gases flow a further distance down the rectangular section flow channel until the reaction $$2 NO + ClO_2 \rightarrow Cl + 2NO_2$$

has reached a satisfactory state of completion. This distance is designed having regard to equations (6), (7), and (8) above. The hydrogen iodide is then introduced via inlet conduit 56, plenum 80 and Teflon* injector needles 82. This HI injector array is essentially identical to the NO injector array.
*Trade mark After passing the location of the HI injector array, the gases immediately flow into laser cavity section 58 of the flow channel between the optical windows 83, 84 mounted on the shorter side (upright as seen in FIG. 3) of the flow channel. The dead gas space on each side of the laser cavity between the windows and the projection of the upright edge 86 of the flow channel is purged out with helium which enters through slots 88 running the length of the lower edge of the windows and fed by supply tube 90. This serves to prevent spent gases from the reaction from accumulating in the dead gas space and contributing to the cavity optical losses. The flow or helium across the window face also serves to keep the window surface free from particulate matter and other deposits that might otherwise lodge there.

The $CaF_2$ windows 83, 84 are installed in such a way that the optical axis passes through the gas mixture immediately downstream of the HI injector array. The axis of the optical cavity is defined by the line joining the centres of the mirrors 66, 68 which are installed facing one another through the windows. It is conceivable that in certain circumstances the laser cavity 58 would be placed further downstream, but at sonic flow velocity it has been indicated empirically that the cavity should be located immediately downstream of the HI injector, e.g. less that one centimeter downstream.

The spent gases, after passing through the optical cavity, flow into a liquid nitrogen-cooled cold trap (not shown) of conventional design. This serves to remove the larger part of the condensible gases from the mixture. Thereafter, the remaining gases (mostly helium) flow into a conventional pump, also not shown.

A prototype embodiment of a subsonic transverse flow laser constructed according to the invention was adapted from a previous design of K. D. Foster and G. H. Kimbell, described in Fourteenth Symposium (International) on Combustion, Aug. 20-25, 1972, pp. 203-210. It consists generally of a rectangular cross-section flow channel 50 milled out of aluminum. The channel dimensions selected for the prototype were 1.5 cm in height by 14 cm across the flow, and the channel had a total length of 30 cm from the conduit 52 for introduction of the $ClO_2$-He mixture at the head end to the downstream end of the laser cavity. The distance from NO injector 54 to HI injector 56 was about 12 cm, at a prevailing pressure of about 2 torr and a flow rate of about 160 ms$^{-1}$. This gave an available reaction time of about 750 $\mu$s for a $ClO_2$ concentration of about $10^{15}$ molecules/cm$^3$. There was no valve between the laser and the cold trap, as this would have been difficult to install and, in any event, the laser operated best with no attempt to limit the pumping speed. The pump used was a 1200 c.f.m. Kinney* pump-blower combination.
*Trade mark The $ClO_2$-He supply to the transverse flow laser conveniently can be generated by a $ClO_2$ generator of the type described with reference to FIG. 2. A series of tests was made to verify that the $ClO_2$ generating column was capable of supplying the increased quantities of $ClO_2$ needed for the subsonic transverse flow laser. The $ClO_2$ absorption band at 4.9$\mu$ was used to monitor the $ClO_2$. The $ClO_2$ generator was found to be adequate. The moisture content of the effluent gas flow was measured using the infrared water absorption band near 2.6 $\mu$ in the same series of experiments. An infrared spectrometer was calibrated using gases containing known concentrations of water vapour. In this way it was found that the gases issuing from the column contained from 0.7 to 0.9% water vapour. A supplementary drying column (not shown) was inserted between the $ClO_2$ column and the needle-valve leading to the laser. This was effective in reducing the water to less than 0.1%. The drying column had no effect on the $ClO_2$ content of the effluent gases as was verified by infrared absorption spectroscopy, using the absorption band of $ClO_2$ near 4.9$\mu$.

To provide for the possible requirement of even greater $ClO_2$ flows, additional $ClO_2$ generators could be installed in parallel with the first.

Where the metering of reagent gases is required, as in the case of the NO and HI flows, and also for the He and $Cl_2$ for the $ClO_2$ generator, Hastings mass flow-meters were employed. Commercially available bottled gases were drawn from the cylinder at a regulated pressure and the flow was measured at that pressure, generally about 1.5 atmospheres absolute. The flow was then admitted to the laser apparatus through a Nupro* Fine Metering needle-valve. For HI, however, regulators are not available and the gas was bled from the cylinder into the flow meter using another needle-valve. Because of this, the pressure varied somewhat in the flow meter depending on the balance of flows through the two needle-valves. The pressure-independent properties of the flow meter ensured accurate measurement of the HI reagents.
*Trade mark The flow lines, gauges, valves and flow meters were constructed of Monel* or stainless steel for corrosion resistance, depending on the gas used.
*Trade mark The laser cavity portion 58 of the flow channel was 5 cm long fit with $CaF_2$ optical windows mounted on the 1.5 cm side of the flow channel at the Brewster angle.

In the prototype apparatus, one mirror 66 was flat and the other 68 was curved with a radius of curvature of 10 m. They were mounted with a distance of separation of 65 cm between them. The flat mirror was a $CaF_2$ optical flat coated with a dielectric multilayer reflective coating (for 3.8$^2\mu$m wavelength) that was partially transmitting at the HCl 3.8$\mu$m wavelength band. Transmissions of 1, 2, 4 and 6 percent were used in the experiments, with greatest power being extracted using the 4% transmission mirror. The curved mirror was a protected metal on Ge totally reflecting (i.e. greater than 99.5% reflecting) mirror.

In the first successful experiments with the prototype transverse flow laser, only about 3-4 mW of light energy was extracted from the apparatus. This was principally due to the fact that a very high reflectively mirror was installed as output coupler in the laser cavity in order to maximize the optical quality of the cavity for a low oscillation threshold. Thus the reflectivity of the output coupler in these experiments was greater than 99%, causing most of the power generated in the cavity to be dissipated internally. The conditions in the cavity for the first observation of lasing were:

| He | 16860 SCCM (cm$^3$/min) | ⎫ through the $ClO_2$ |
| $Cl_2$ | 335 SCCM | ⎬ generator |
| NO | 1700 SCCM | ⎪ into the |
| HI | 680 SCCM | ⎭ optical cavity |
| cavity pressure 0.9 torr | | |

Under these conditions, a power of 3-4 mW was measured using an Eppley* thermopile.
*Trade mark Higher power of about 4 watts was extracted from the laser by increasing the percentage output coupling (percentage of light transmitted) to 4% and optimizing the reagent gas flows. The $Cl_2$ flow, however, was maintained at 335 SCCM to provide a theoretical Cl atom flow of 670 SCCM, or 0.5 mmol s$^{-1}$. The cavity conditions during this experiment were:

| He | 18300 SCCM | ⎫ |
| $Cl_2$ | 335 SCCM | ⎬ through $ClO_2$ generator |
| NO | 1800 SCCM | ⎪ |
| HI | 1000 SCCM | ⎫ into laser |
| He | 50900 SCCM | ⎭ |
| total pressure 2.43 torr | | |

It is conceivable that it will be possible to increase the power output in the future. Higher $Cl_2$ flows can be used by bringing additional $ClO_2$ generators on line in parallel with the first. Further, it is expected that more power can be extracted for given $ClO_2$ flow by empirically optimizing the optical cavity and flow conditions. At higher gas flows some over-addition of NO and HI may be helpful to improve reaction completion under relatively poor mixing conditions.

In accordance with the second process, the hydrogen iodide is mixed with the chlorine dioxide prior to the injection of nitric oxide into the flow path. Again referring to FIGS. 3 and 4, the $ClO_2$-He mixture can be supplied as before via inlet pipe 52 and plenum 70. The hydrogen iodide is then injected via inlet pipe 54 and plenum 76 thence to the flowpath via injector needles 77. The reactions are then initiated by injecting nitric oxide into the flowpath via inlet pipe 56, plenum 80 and injector needles 82. The relative spacing of the injector needle arrays with respect to one another are not critical if this process is used, provided that sufficient mixing of the reagents occurs. Also, the optical cavity should as before be located immediately downstream of the injector needles 82.

As an example of representative operating conditions applicable to the second process, flow rates for the gases were as follows:

| He | 15000 SCCM | through the |
| Cl | 700 SCCM | $ClO_2$ generator |
| HI | 1000 SCCM | through injector needles 77 |
| NO | 5000 SCCM | through injector needles 82 |

Total pressure in the flowpath in the vicinity of the optical cavity was approximately 4 torr. The power obtained was slightly more than half a watt with 4% output coupling.

The power realized from the prototype subsonic embodiment of the HCl transverse flow laser is not necessarily the maximum that can be obtained, for given laser dimensions. It may be possible, in all likelihood, to increase the partial pressures of active species in the laser and obtain higher power performance. However, as the laser is scaled to higher pressure, vibrational-vibrational exchange processes between HCl † molecules decrease the inverted population. The effect of these processes can be minimized by operating at higher (i.e. supersonic) linear velocity and, hence, shorter residence times in the laser cavity.

Some of the factors which are likely to influence the design and operation of a supersonic transverse flow laser are considered below.

A subsonic pre-reactor for production of Cl atoms at moderate pressures could be employed. Subsequent expansion to supersonic velocities of the resultant gas could then be performed before injecting the HI into this expanded, lowerpressure flow. The lasing could then be carried out in this low pressure expanded flow and a diffuser could conceivably be added, downstream of the laser cavity, to return the flow to a higher pressure. This would provide pumping at higher pressure, and this minimizes the volume pumping rate required for a given mass throughout.

When the population of Cl in the gases flowing through the pre-reactor reached a maximum, the gases would be expanded through a nozzle of a convenient geometry into an optical cavity region defined by suitable laser mirrors. In this region, the pressure of the gases would fall and their linear velocity would rise rapidly to supersonic values. Into this expanding gas, the HI would be injected just upstream of the optical axis, where the reaction:

$$Cl + HI \xrightarrow{10} HCl^\dagger + I$$

would occur.

The supersonic expansion proposed above would require the production of Cl atoms in a high pressure environment. However, another possibility for the production of the Cl atoms exists. If we consider the system of reactions 1 – 3 (page 7 above) it can be seen that, if a volume of NO equal to instead of double that of the $ClO_2$ is added, the $ClO_2$ is just converted to ClO with the formation of an equal volume of $NO_2$ by:

$$ClO_2 + NO \rightarrow ClO + NO_2$$

ClO molecules are known to be lost in the process:

$$ClO + ClO + M \xrightarrow{11} Cl_2 + O_2 + M \quad K_{11} = 1.0 \times 10^{-31} cm^6 s^{-1}$$

ClO molecules may perhaps also be lost by the process:

$$ClO + ClO \xrightarrow{12} Cl_2 + O_2 \quad K_{12} = 5 \times 10^{-14} (350° K)$$

This process should never compete with reaction 11 for ClO loss as long as the pressure is greater than about 15 torr; in general, it should not be a serious loss for the time scales involved in the transverse flow laser.

The loss rate for ClO molecules by reaction 11 has been estimated from existing kineticdata to be about 14 times slower than that for Cl atoms by the relaxation processes previously described. Therefore, by using ClO molecules as the intermediate rather than Cl atoms, it is possible to scale to higher pressures before being limited by pressure-dependent losses of the intermediate becoming comparable to the rate of formation of the intermediate.

Furthermore, ClO molecules are a potentially useful possibility as the intermediate species since they can be very rapidly converted into Cl atoms by the reaction $$NO + ClO \xrightarrow{3} NO_2 + Cl$$

in a non-chain process. Since this reaction is not a chain process, the HI necessary for the generation of the $HCl^+$ molecules could be added at the same injector as the final volume of NO. Then the Cl atoms would be consumed immediately as they are formed, and the two reactions could be carried out at a position immediately upstream of the optical cavity. This is the basis for the "split NO flow" proposal for scaling ClO production to higher pressures than is possible for Cl production. (Since the pressure-induced rate of loss of ClO is theoretically about 14 times slower than that of Cl, the generation of ClO could be carried out at correspondingly higher pressures. This permits scaling to pressures in excess of 100 torr, according to presently available rate data.)

The supersonic HCl transverse flow laser would therefore optimally include a subsonic pre-reactor, operating at relatively high pressure (e.g. 50 to 100 torr), where ClO molecules would be produced. The gases would be expanded as proposed above and a mixture of NO and HI would be injected just upstream of the optical axis, where the reactions:

$$NO + ClO \xrightarrow{3} NO_2 + Cl$$

and $$Cl + HI \xrightarrow{10} HCl^\dagger + I$$

would occur sequentially.

Such an arrangement would incorporate several desirable features:

1. The generation of active ClO molecules would be carried out rapidly at high pressures.
2. The generation of Cl atoms and their reaction with HI to produce $HCl^\dagger$ could be carried out simultaneously rather than in two steps, thus requiring only a single gas injection array for both HI and the second influx of NO in the expanded supersonic flow. Since it has been found that NO and HI tend to react slowly at higher pressures it may be necessary to design injectors to avoid prolonged contact of NO and HI at these high pressures.
3. The energy flux carried into the cavity as $HCl^+$ is high because of the great velocity of the gas, but static pressures are maintained low, preventing loss of population inversion by vibrational exchange processes.
4. By adding a diffuser downstream of the cavity, an increase in pressure (up to several times the cavity pressure) should be capable of attainment. This latter feature would allow the pumping to be conducted as higher pressure and, hence, smaller vacuum pumps would be needed for a given mass throughout.
5. The ambient Cl concentration in the laser cavity would be kept low, preventing deactivation by the process:

$$Cl + HCl_v \rightarrow Cl + HCl_{v-1}$$

A schematic model to implement the foregoing proposal is illustrated in FIG. 6. A mixture of $ClO_2$ in He flows from a $ClO_2$ generator (not shown in FIG. 6) into subsonic duct 91 until it encounters an NO injector 92. At this point the pressure is high, say 50–100 torr, and the reaction $$NO + ClO_2 \rightarrow NO_2 + ClO$$

produces a mixture of He, $NO_2$ and ClO before reaching the nozzle 93. (This is important, since the chemistry might "freeze out" in a strong expansion, feeding unreacted $ClO_2$ into the supersonic region). As the gases expand to pressures where the concentration of ClO is of the order $10^{15}$ cm$^{-3}$ downstream of the nozzle 93, more NO and HI is injected through injectors 94, where the reactions $$NO + ClO \xrightarrow{2} NO_2 + Cl$$

$$Cl + HI \xrightarrow{10} HCl^\dagger + I$$

takes place rapidly. Lasing of $HCl^\dagger$ occurs as the rarified gases pass through the axis of the optical cavity 95. A diffuser 96 in the form of a constriction is shown for the purpose of permitting possible recovery of some of the plenum pressure to reduce pumping requirements from exhaust duct region 97.

The technique of split flow NO addition has been verified in the subsonic apparatus illustrated in FIGS. 3 and 4.

For the split flow NO addition the final downstream injection elements 56, 80, 82 were replaced by a dual injector with the two sets of injector needles approximately 2 cm apart. This was found necessary since if the hydrogen iodide and nitric oxide were injected together in the plenum 80 they partially reacted and formed iodine which gradually blocked the injection needes 82. Although this reaction occurred in the high pressure low flow velocity region of the plenum, it was not significant at the much lower pressures and higher flow velocities of the laser flow tube 50 and thus did not interfere with the laser cavity chemistry. The experimental conditions during this verification were:

| He | 15,000 SCCM | |
| --- | --- | --- |
| | | through $ClO_2$ generator |
| $Cl_2$ | 700 SCCM | |
| NO | 4,000 SCCM | constant total flow through all injectors |
| NO | 1,000 SCCM | through injector needles 77 |
| NO | 3,000 SCCM | through second set of final downstream injector needles |
| HI | 1,000 SCCM | through first set of final downstream injector needles 82A |

The total pressure was approximately 4 torr.

Using a 4% output coupling mirror, the power obtained was 1 watt with the optical axis located 1 cm downstream of the second final downstream injector row and 1.45W with the optical axis located 1.8 cm downstream of the said row. The higher power at the further downstream location of the optical axis no doubt reflects the slower rate of $HCl^\dagger$ build up, since the latter is controlled by the rate of Cl atoms release by reaction 2 rather than by the very much faster rate of Cl atoms with HI. The total nitric oxide flow was in excess of that required to convert the chlorine dioxide to chlorine atoms and it appeared that the laser was more efficient with this higher nitric oxide flow. This may occur because the excess nitric oxide increases the rate of chlorine atom release in reaction 2.

In the construction of a supersonic laser it may be advantageous to initiate all the chemistry in the expanded (supersonic) flow. Accordingly, the second process, in which the hydrogen iodide is injected before the reactions are initiated by the nitric oxide injection, may be preferred.

Variations and modifications of the above-described structures and operations will occur to those skilled in the art. For example, it may be useful to mount various injectors adjustably with respect to the flowstream, so that the distances between them and their distance from the optical cavity could be varied to obtain optimum operating conditions for given pressures, concentrations and flow rates of the various reagents. Internally mounted mirrors rather than externally mounted mirrors could be used at the optical cavity. The scope of the invention is not to be limited to the specific embodiments and processes described above, but is to be ascertained by the appended claims.

What is claimed is:

1. A continuous wave chemical laser comprising:
   (1) a channel defining a confined flow path, said channel containing a gaseous mixture consisting of the reactant gases hydrogen halide, nitric oxide and chlorine dioxide;
   (2) an optical resonator cavity disposed in the said flow path;
   (3) supply means for supplying the said reactant gases hydrogen halide, nitric oxide and chlorine dioxide, said halide being selected from the group consisting of hydrogen bromide and hydrogen iodide, said gases being respectively contained in said supply means;

(4) generating means for generating an excited gaseous lasing medium, said generating means consisting of first injecting means for injecting said nitric oxide into the channel flow path upstream of the optical cavity, and second separate injecting means for separately injecting said hydrogen halide and said chlorine dioxide into the channel flow path upstream of the optical cavity, wherein the nitric oxide reacts with the chlorine dioxide to produce chlorine atoms, which atoms in turn react with the hydrogen halide to form hydrogen chloride, said hydrogen chloride being at a sufficient elevated energy level that the population of some of the energy states are inverted, wherein the resulting gaseous medium is laseable and the sequence of injection of the hydrogen halide is such that the reaction of the said hydrogen halide with the said chlorine atoms is in a time period which is less than the time period for 63% loss of the chlorine atoms by recombining into chlorine molecules; and (5) exhaust means for exhausting gases from the flow path downstream of the optical cavity.

2. The apparatus of claim 1 wherein the second injecting means includes separate injecting means for the hydrogen halide and the chlorine dioxide.

3. The apparatus of claim 1 wherein there is a further injection means for injecting nitric oxide downstream of the place of said reaction of nitric oxide and chlorine dioxide.

4. A method for producing a continuous wave chemical laser consisting of injecting gaseous nitric oxide from a first injector into a flow path upstream from an optical resonator cavity, separately injecting chlorine dioxide and hydrogen halide selected from the group consisting of hydrogen iodide and hydrogen bromide from a second injector into the flow path upstream from the optical resonator cavity whereby said flow path contains a mixture consisting of the reactant gases of hydrogen halide, nitric oxide and chlorine dioxide, wherein the said nitric oxide reacts with the said chlorine dioxide to produce chlorine atoms, which atoms in turn react with the said hydrogen halide to form hydrogen chloride, said hydrogen chloride being at a sufficiently elevated energy level that the population of some of the energy states are inverted, wherein the resulting gaseous medium is lasable in the said optical resonator cavity and the sequence of injection of the hydrogen halide is such that the reaction of the said hydrogen halide with the said chlorine atoms is in a time period which is less than the time period for 63% loss of the chlorine atoms by recombining into chlorine molecules.

5. A method as defined in claim 4 wherein carbon dioxide is introduced into the flowpath at a point downstream prior to the point at which hydrogen halide is introduced whereby excited hydrogen chloride forms and transfers energy to the carbon dioxide to generate excited carbon dioxide, and then lasing the carbon dioxide in hybrid flow mode.

* * * * *

UNITED STATES PATENT OFFICE
CERTIFICATE OF CORRECTION

Patent No. 4,099,140               Dated July 4, 1978

Inventor(s) David R. SNELLING ET AL

It is certified that error appears in the above-identified patent and that said Letters Patent are hereby corrected as shown below:

[73]  Assignee:  Her Majesty the Queen in Right
                 of Canada as represented by the
                 Minister of National Defence,
                 Ottawa, Canada Signed and Sealed this Eighth Day of May 1979

[SEAL]

Attest:

RUTH C. MASON
Attesting Officer

DONALD W. BANNER
Commissioner of Patents and Trademarks